(No Model.) 2 Sheets—Sheet 2.
H. PALMIERI.
STEEPING, BOILING, OR EXTRACTING VESSEL.
No. 454,879. Patented June 30, 1891.
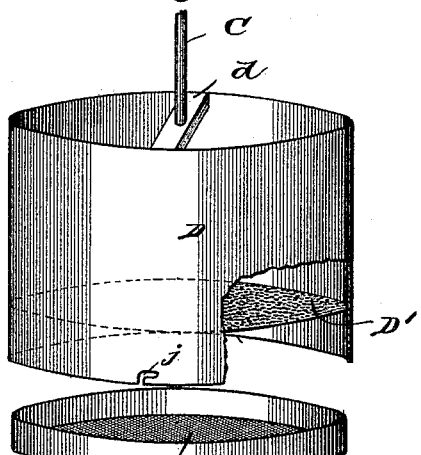
Fig. 3.
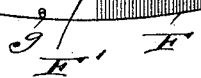
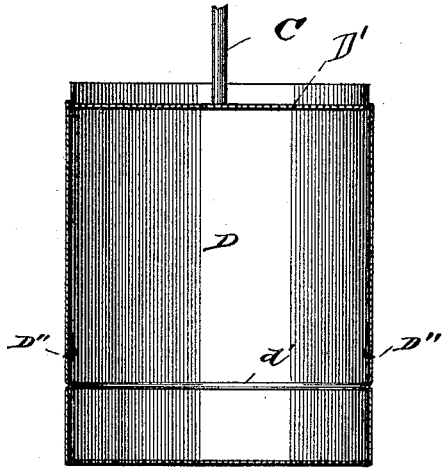
Fig. 4. Fig. 5.
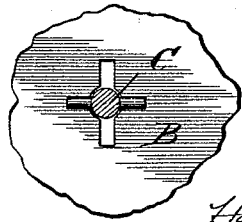
Fig. 6.
Witnesses,
D. S. Mann,
Frederick F. Goodum
Inventor,
Henry Palmieri
By, Offield & Towle
Attys.

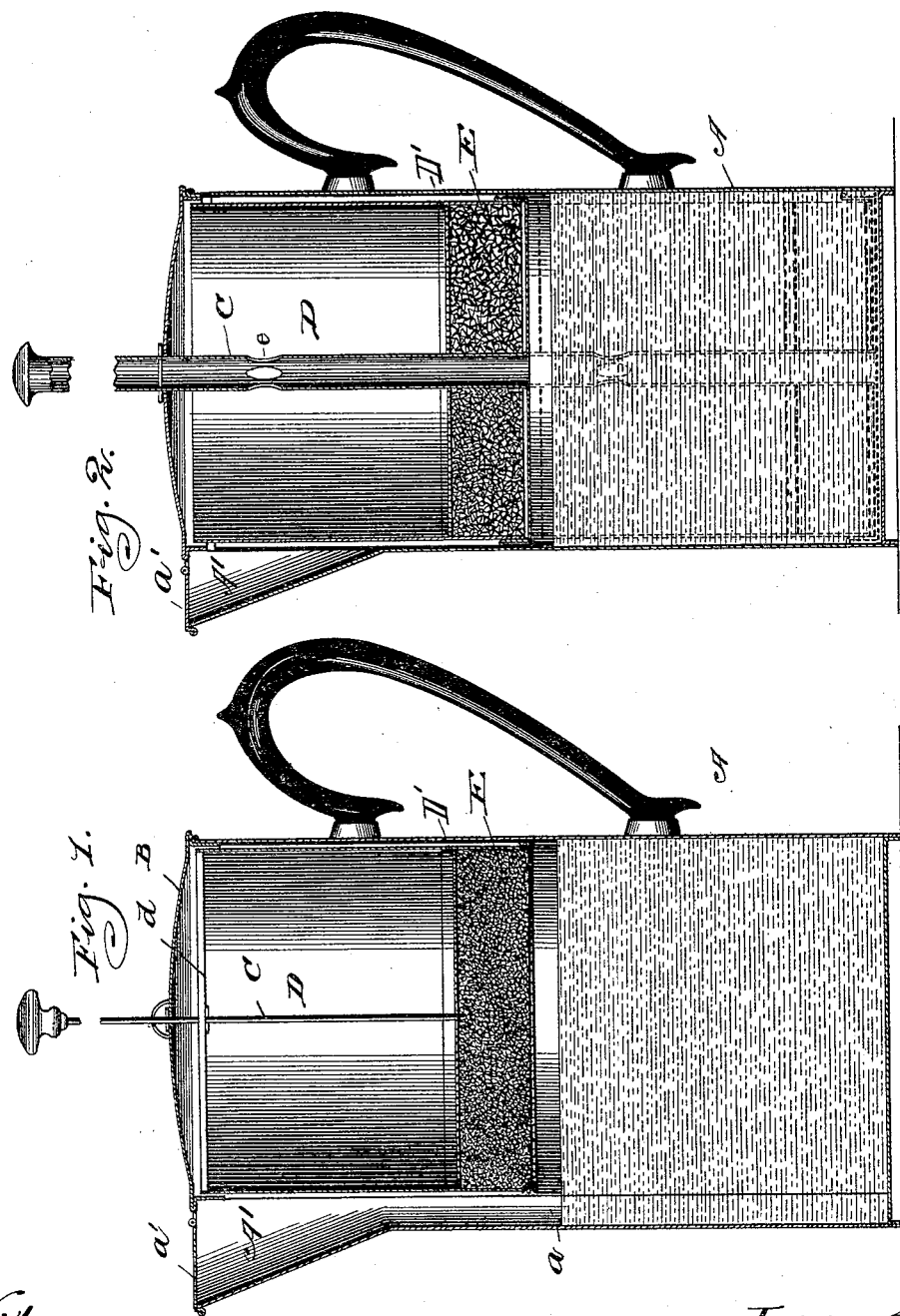

UNITED STATES PATENT OFFICE.

HENRY PALMIERI, OF CHICAGO, ILLINOIS, ASSIGNOR OF ONE-HALF TO CHARLES J. STROMBERG, OF SAME PLACE.

STEEPING, BOILING, OR EXTRACTING VESSEL.

SPECIFICATION forming part of Letters Patent No. 454,879, dated June 30, 1891.

Application filed July 31, 1890. Serial No. 360,488. (No model.)

*To all whom it may concern:*

Be it known that I, HENRY PALMIERI, a citizen of the United States, residing at Chicago, Illinois, have invented certain new and useful Improvements in Steeping, Boiling, or Extracting Vessels, of which the following is a specification.

The object of my invention is to provide a vessel or apparatus wherein decoctions of substances such as berries, grains, seeds, and herbs may be made, and whereby the largest percentage of extractive material is obtained free from the dregs and other waste matter.

The invention is particularly applicable to the making of coffee, and I have therefore illustrated my invention in connection with a vessel for the making of that beverage. The objects to be accomplished in the production of good coffee are, first, to obtain a complete saturation of the pulverized berries with water and to extract from the berries a liquid which shall contain the aromatic properties of the berries and to separate such liquid from the grounds or insoluble parts of the berry. To effect these objects it is necessary to pass the water at an elevated temperature through the pulverized berries repeatedly. This common method of boiling the water with the coffee therein is objectionable, and to obtain the best results the water should be boiled separately from the coffee and then passed repeatedly through the coffee, whereby to thoroughly saturate the latter and to extract therefrom its aromatic and other desired properties. This has been attempted by providing for the immersion of the pulverized coffee in the boiling water, the coffee being contained in a bag or in a vessel having a perforate bottom through which the water passes upwardly, and an open top which allows the grounds to escape over the top. This is necessarily a slow process, and the coffee produced thereby is inferior in quality and flavor.

In carrying out my invention I provide a vessel preferably having straight sides with an enlargement or passage at one or more points of the perimeter and in which vessel the water is heated to the boiling-point. The pulverized coffee is placed in a second vessel having also straight sides and of an exterior diameter approximating the interior diameter of the outer shell or boiler and having also a perforated diaphragm and a removable cup in its bottom, said cup having also a perforated bottom of wire-cloth, and in this cup the ground coffee is confined between the two sieves. The water is then heated to the boiling-point and the inner vessel inserted in the boiler and forced downward therein, displacing the boiling water and causing it to rise through the passage formed by the peripheral enlargement of the boiler-shell, and the water rising through said passage pours into the open top of the inner vessel containing the coffee, which vessel is then raised and held suspended until the water percolates through the coffee, effecting its complete saturation and the extraction of its aromatic and other desired properties. The raising of the inner vessel may be effected by spring action or by other mechanical means or manually. The inner vessel acts in the same manner as the piston of an engine, and the passage is the escape or port, and this operation of displacing the water and draining it through the coffee should be repeated a number of times in order to thoroughly extract the desired properties. The inner vessel may then be removed and the liquid poured off through the passage, which is flared out at its outer end to form a spout. The inner vessel is preferably manipulated by a rod which is connected to it at one end, and which rod is projected through the cover of the boiler, so that the operation of passing water through the pulverized coffee may be performed without permitting the escape of steam.

Instead of providing the passage for the water in the perimeter of the boiler-shell, I may make the operating-rod for the inner vessel hollow and perforate it for the discharge of the water therethrough when it is displaced by the descent of the inner vessel.

In the accompanying drawings, Figure 1 is a sectional elevation of a boiler having a peripheral enlargement and an inner vessel having its bottom covered by a strainer and a fixed disk to which the operating-rod is connected.

Fig. 2 is a similar view showing the boiler with a symmetrical wall and the operating-rod hollow to provide a passage for the water, the lower end of the rod being connected to a removable bottom and passed through a stationary diaphragm. Fig. 3 is a perspective view of the inner vessel, the operating-rod being connected to a cross-bar at its top and having a fixed perforated diaphragm and a removable perforated cup. Fig. 4 shows the operating-rod attached to the bottom and a removable perforated disk having a weight on its upper side through which the rod passes; and Fig. 5 is a sectional elevation of the inner vessel, showing the rod connected to a movable perforated diaphragm and the wall of the vessel provided with a bead to form a seat for said diaphragm and with springs to hold it in place, and the vessel having a permanent perforated bottom. Fig. 6 is a detail of the cover and operating-rod.

In the drawings, A represents the shell of the boiler, which in the form shown in Fig. 1 is provided with a peripheral enlargement $a$, forming a vertical passage which terminates in the spout A'. This boiler may have the cover B, and the spout may also have the flap-cover $a'$.

D is the inner vessel, which is so made as to telescope with the boiler A, and is adapted to fit closely therein, so as to displace the water beneath it when it is forced downward toward the bottom of the boiler, whereby the water will be caused to escape through the passage $a$ and overflow into the inner vessel.

C is an operating-rod, which may be secured in any convenient manner to the inner vessel, and the latter is provided in all cases with a perforate bottom on which the pulverized coffee (indicated at E) is placed. This bottom may take the form of a cup, as shown in Fig. 3, in which F represents a ring or annulus, and F' wire-cloth stretched therein, and this cup may be adapted to telescope with the vessel D, or to be secured thereby by means of the locking-studs $g$, which engage the locking-notches $j$ of the vessel D. Within the vessel D is the perforated diaphragm D', which may also be formed in any convenient manner and be stationary or movable within the vessel D. In Figs. 1, 2, and 3 it is permanently secured within the vessel D. In Figs. 4 and 5 it is removably secured, and in the latter instance it is connected with the operating-rod. This rod, as shown in Fig. 1, is connected to the diaphragm, and is steadied by braces $d$, extending across the open end of the vessel D. As shown in Fig. 2, it is hollow, and is formed integrally with the removable perforated cup forming the bottom of the vessel D and passed through an aperture in the fixed diaphragm and has escape-apertures $e$ therein. In Fig. 3 the rod is connected to the cross-bar $d$. In Fig. 4 it is connected to the permanent perforated bottom, and the diaphragm is apertured to adapt it to be slipped over the rod, and said diaphragm carries a weight H, which causes it to press or pack the pulverized coffee.

In Fig. 5 the operating-rod is connected to a movable diaphragm, and the wall of the vessel D is provided with a circumferential bead $d'$ to form a seat for the diaphragm, which is confined by the springs D''.

It will be observed that the diaphragm D' is in every case perforate, and that the bottom is also perforate. The material of which these parts are constructed may be metal or light sheets of wood and provided with apertures, or they may be made from wire-cloth, and the bottom may be made in some instances from any cloth through which the water will percolate and which is sufficiently fine to prevent the passage of the granulated material.

In use the water with which the decoction is to be made is boiled in the outer vessel, and then the inner vessel having the pulverized coffee or other material is inserted, and the cover is closed to confine the steam. Said vessel is then forced downward, displacing the water and causing it to rise through the passage provided therefor and overflow into the inner vessel, which being raised, either manually or mechanically, the water is caused to percolate through the material contained in the bottom of the inner vessel, and this operation is repeated until the saturation of the extractive material is complete and the water impregnated with the qualities which it is desired to extract, when the cover may be opened and the inner vessel removed, leaving the decoction in the outer vessel.

The invention is applicable to the making of beverages and medicines, and generally wherever berries, grains, or herbs are to be treated with a liquid for the extraction of some of their properties. The water or other liquid may be thoroughly and rapidly impregnated with the desired extractive properties without boiling the material in it, which, as is well known, is objectionable in some instances, because undesirable properties—such as the tannin in coffee—are thereby extracted.

It is obvious that modifications may be made in the details of construction without departing from the spirit of my invention, which is embodied in an apparatus having two vessels adapted to telescope and constructed to provide a passage for the liquid when the vessels are telescoped. Mechanical means may be employed for raising the inner vessel, such as a rack and pinion manipulated by a crank, or a cable and pulley or spring.

My invention is applicable to vessels of large size, such as the coffee-boilers used in hotel-kitchens and restaurants, and also to the extraction of grains, berries, or herbs in large quantities for the production of beverages and medicines and other extracts. The passage for the liquid may be formed in the wall of the inner vessel by depressing a portion of said wall inwardly, or a separate escape-pipe may be used. If desired, a plurality of these passages may be provided.

I claim—

1. An apparatus for the preparation of decoctions, comprising in combination an outer vessel or boiler for the liquid and an inner vessel to contain the material to be extracted, said inner vessel having a perforate bottom and closely fitting the inner walls of the boiler, one of said vessels constructed to provide a passage and the inner vessel being adapted to displace the liquid in the outer vessel when telescoped therewith, whereby to cause said liquid to escape through the passage and overflow into the inner vessel and upon the rising of the latter to percolate through the material therein, substantially as described.

2. In an apparatus for the preparation of decoctions, the combination of an outer vessel or boiler for the liquid and an inner vessel to contain the material to be extracted, said inner vessel having a perforate bottom wall and a perforated diaphragm and adapted to telescope with the boiler, and one of said vessels constructed to provide a passage for the liquid when displaced by the downward movement of the inner vessel, substantially as described.

3. An apparatus for the preparation of decoctions, comprising in combination an outer vessel or boiler for the liquid, having an enlargement in its perimeter to provide an escape-passage, and an inner vessel having a perforate bottom adapted to telescope with the outer vessel, whereby to force the liquid therein upwardly through the passage and cause it to overflow into the inner vessel, substantially as described.

4. In an apparatus for the preparation of decoctions, the combination, with an outer vessel or boiler and an inner vessel adapted to telescope with the outer vessel, and one of said vessels constructed to provide an escape-passage for the liquid when the vessels are telescoped, of an operating-rod for moving the inner vessel, substantially as described.

HENRY PALMIERI.

Witnesses:
FREDERICK C. GOODWIN,
N. M. BOND.